May 12, 1959 E. WENNERBO 2,886,329

TONE ARM AND CONTROL MEANS THEREFOR

Filed May 16, 1955

INVENTOR

ERIK WENNERBO

BY Young, Emery & Thompson

ATTYS.

United States Patent Office 2,886,329

Patented May 12, 1959

2,886,329

TONE ARM AND CONTROL MEANS THEREFOR

Erik Wennerbo, Motala, Sweden, assignor to Industriaktiebolaget Luxor, Motala, Sweden, a corporation of Sweden Application May 16, 1955, Serial No. 508,758

Claims priority, application Sweden May 25, 1954

3 Claims. (Cl. 274—15)

Figures 1, 2, 3, 4, 5:
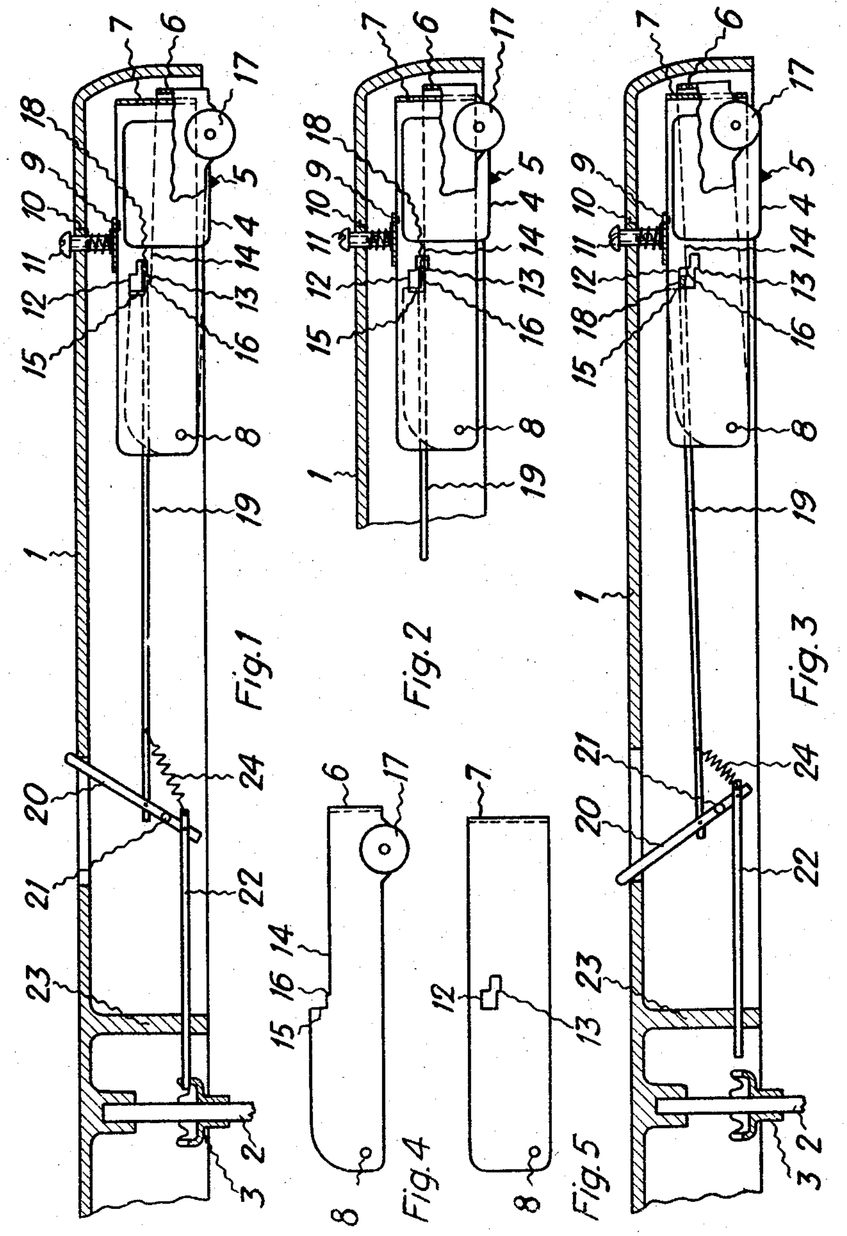

The present invention relates to a device for placing the tone arm needle in the correct initial playing position on a sound disc record to be played irrespective of the diameter thereof in that kind of phonographs, in which before the playing of a record the tone arm is set down on the record by the drive mechanism of the phonograph at a distance from its rotational centre, which corresponds at the most to the radius of the initial turn of the sound groove in a record of the smallest diameter intended to be played, and also in which a support member arranged on the tone arm prevents the needle from engaging the record, said support member carrying the tone arm on the record when the arm is subsequently moved by the drive mechanism towards the edge of the record, on reaching which the needle is brought into engagement with the initial turn of the sound groove of the record as a result of which the support member is moved upwards to a position above the horizontal plane through the needle point in order not to prevent the playing of the record.

In a known device the support member is formed as a roller rotatably mounted in an arm pivotally supported on the tone arm. The shaft of the roller is disposed at such an angle with the radius of the record drawn through the point of engagement of the record with the roller that, when the record rotates, the roller moves radially outwards on the record thereby swinging the tone arm towards the periphery of the record.

As the tone arm has a fixed rotational centre it follows, that the power acting on the roller is entirely dependent upon the position of the roller on the rotating record during its radially outward movement. Generally, the angular position of the roller shaft is so selected that a convenient speed is imparted to the tone arm just before the roller drops down outside the edge of the record thereby bringing the needle into engagement with the record. As there are, however, records with different diameters, difficulties arise in providing an angular position of the roller, which suits all these records. A solution, which I believe has not been proposed earlier, would be to have the roller arranged on an arm, which is so connected by a linkage to the tone arm that the shaft of the roller during the whole outward movement of the tone arm forms substantially the same angle with the radius of the record through the point of engagement of the record with the roller.

The present invention constitutes another solution of the problem referred to and provides a device which is of simple and uncomplicated construction and at the same time very reliable in operation.

One embodiment of this device will be described in the following with reference to the accompanying drawing, in which Figs. 1–3 are side views illustrating different working positions of a tone arm provided with the device according to the invention and Figs. 4 and 5 are detail views illustrating parts of this device.

In the drawing 1 designates a tone arm, at the rear of which is fixed a shaft 2. About the shaft 2 is rotatably disposed a notched wheel 3, which is in engagement with the drive mechanism (not shown) of the phonograph to be driven in two opposite directions for horizontally swinging the tone arm outwards and inwards. In the front of the tone arm the pick-up head 4 with its needle 5 is rigidly arranged by means not shown. An outer stirrup 6 and an inner stirrup 7 are arranged so as to embrace the front and two sides of the head 4 and a horizontal pivot pin 8 is fixed to the tone arm, the rear open ends of the two stirrups 6 and 7 being swingably mounted around the pin 8. The upper edges of the two legs of the inner stirrup 7 are connected together by a crosspiece 9, which is fixed thereto. Through actuation of a tension spring 10 the stirrup 7 is biased counter clockwise so that the crosspiece 9 is brought into contact with the lower end of an adjusting screw 11 threaded in the tone arm. By this screw 11 the height position of the inner stirrup 7 is adjusted in relation to the tone arm 1. The stirrup 7 is also provided with a double slot 12 in one of the stirrup legs, this slot being stepped so that a stop edge 13 is formed. Just in front of the slot 12 of the inner stirrup 7 the upper edge of the outer stirrup 6 has been shaped in a corresponding manner, i.e. the stirrup 6 is formed with an upper actuating edge 14, a perpendicularly arranged stop edge 15 and another perpendicular stop edge 16 disposed slightly behind the edge 13. A roller 17 is rotatably mounted on the right hand outside (looking at the front of the tone arm) of the last mentioned stirrup 6.

With the slot 12 of the inner stirrup 7 and the edges 14, 15 and 16 of the outer stirrup 6 cooperates the end 18 at right angles to the main length of a rectangular section rod 19, the other end of which is pivotally mounted in a lever 20. This lever in turn is rockably mounted about a shaft 21 arranged horizontally in the tone arm, which lever by passing across a slot in the top of the tone arm extends somewhat above it. The rod 19 is mounted on the lever 20 on the one side of its shaft 21. On the other side of this shaft is pivotally mounted the one end of another rod 22. In front of the shaft 2 a cross wall 23 is provided in the tone arm for guiding the rod 22, which passes through this wall and on its other side cooperates with the notched wheel 3 above mentioned before. A tension spring 24 arranged between the two rods 19 and 22 tends to actuate them in such a manner that the rod 19 is moved backwards, the rod 22 is moved forwards and the lever 20 is turned in counter clock-wise direction. The angularly shaped end 18 of rod 19 will thereby be brought backwards in the slot 12 of the inner stirrup 7 and the rod 22 will be brought out of engagement with the notched wheel 3.

The device described above functions in the following manner.

In the starting position of the phonograph the tone arm rests upon its support outside the periphery of the turntable not shown and the various parts are in the positions shown in Fig. 1. Under the influence of its own weight the stirrup 6 now occupies its lowest position in relation to the tone arm with the roller 17 below the needle 5. The downward movement of the stirrup 6 is limited in this position by means not shown, e.g. a stop edge on the tone arm. In this position of the stirrup 6 its edges 14—16 do not cover any part of the slot 12 of the stirrup 7, and the angularly shaped end 18 of the rod 19 is resting against the stop edge 13 of the slot 12, which means that the spring 24 cannot displace the rods 19 and 22. The latter will thereby be in engagement with the notched wheel 3 and when this wheel is angularly moved (rotated) in the one direction by the drive mechanism this movement is transferred to the tone arm via the rod 22 and the wall 23, so that the tone arm is swung towards the centering pin of the phonograph, where the tone arm is then lowered by suitable mechanism (not shown) on to the record intended to be played.

When the roller 17 contacts the record the weight of the tone arm will cause the outer stirrup 6 to be turned somewhat in counter clock-wise direction in relation to the said arm, whereby the actuating edge 14 of the outer stirrup moves the end 18 of the rod 19 somewhat upwards out of engagement with the stop edge 13 of the slot 12. The spring 24 is therefore now permitted to displace the rod 19 to the left in the drawing, but this displacement is almost immediately stopped by the stop edge 16 of the outer stirrup 6, whilst the upward movement is arrested by the upper edge of the lower right step of the slot 12 (Fig. 5). This displacement of the rods 19 and 22 is not sufficient to bring the rod 22 out of engagement with the notched wheel 3 and therefore the tone arm is still coupled to the drive mechanism of the phonograph. The positions, which the parts now occupy, are shown in Fig. 2, from which it also can be seen that the bottom of the roller 17 is still below the needle 5.

On further but opposite movement of the notched wheel 3 the tone arm is swung radially outwards to the periphery of the record with only the roller 17 in engagement with the record. This outward movement continues until the roller drops down outside the edge of the record, in which downward movement the outer stirrup 6 participates. Thus for a moment the stirrup 6 occupies the position shown in Fig. 1, the end of the rod 19 being released from the stop edge 16 by the lower left hand surface of the slot 12 so that the rod 19 can now be displaced to the left by the spring 24 as shown in the drawing. During this movement the end 18 contacts the stop edge 15 of the outer stirrup 6 and gives to this stirrup such an angular movement in counter clockwise direction that the bottom of the roller 17 is moved up to a position above the needle 5. At the same time as the rod 19 is displaced to the left the rod 22 is displaced to the right, so that it is brought out of engagement with the notched wheel 3.

The needle 5, which when the roller 17 dropped outside the edge of the record entered its initial turn of the sound groove, can now play the record without hindrance from the roller 17 and with the tone arm disengaged from the drive mechanism.

From the foregoing it appears that the disengagement of the drive mechanism occurs exactly at the time when the needle has been brought into playing position on the record irrespective of the record diameter and that at the same time a raising of the roller to a position above the needle 5 occurs. The regulating member (not shown) e.g. in the form of a cam disc, which member in a record changer is necessary for the regulation of its functions and thus controls the tone arm movements and the record changing operation, thereby also driving the notched wheel 3, is actuated by the drive mechanism during a certain time period between each record playing. As the records are of different diameter this time period must be enough for the roller 17 to be brought outwards to the edge of even a large record. However, in the case of a small record when the driving connection to the tone arm is broken sooner this means that the regulating member must continue to rotate a certain time past the moment of breaking this connection.

The positions which the parts occupy during the playing of the record are shown in Fig. 3.

When the playing of the record is ended the tone arm is first raised by means not shown and thereafter the lever 20 is rocked in clockwise direction about its shaft 21, by a member not shown, this member e.g. actuating the part of the lever extending above the tone arm 1. Thus the rod 19 is displaced to the right so that the outer stirrup 6 is free to drop down. Simultaneously the end 18 of the rod 19 is brought by action of the spring 24 behind the stop edge 13 of the slot 12, while the rod 22 is displaced to the left into engagement with the notched wheel 3. The parts now occupy the positions shown in Fig. 1 and after that the tone arm by actuation of the drive mechanism via the notched wheel 3 is swung outwards to its rest position and the same motion cycle can be repeated.

Other embodiments of the device according to the invention are of course possible within the scope of the appended claims.

What I claim is:

1. In combination with a tone arm of a phonograph, a drive mechanism for moving the tone arm laterally over a phonograph record independently of any movement of the record, an elongated support member pivotally mounted at one end on said tone arm, the opposite end of said support member engaging the surface of said record during the lateral motion of the tone arm to support the tone arm on the record, and disengageable means linking said support member to said drive mechanism whereby the downward movement of said support member dropping over the circumferential edge of the record causes the means linking said drive mechanism to become disengaged therefrom.

2. The combination according to claim 1 in which the means linking said support member to said drive mechanism comprises a first rod pivotally mounted on said tone arm, a second rod pivotally connected at one end to said first rod and having its other end adapted to engage said support member, and a third rod pivotally connected at one end to said first rod and having its other end adapted to engage said drive mechanism.

3. The combination according to claim 1 in which the said first rod is normally biased in one extreme position by a spring interconnecting said second and third rods and adapted to be held in a second extreme position by said second rod engaging said support member.

References Cited in the file of this patent

UNITED STATES PATENTS

| | | |
|---|---|---|
| 1,629,986 | Battey et al. | May 24, 1927 |
| 2,504,596 | Scriven et al. | Apr. 18, 1950 |
| 2,722,426 | Wennerbo et al. | Nov. 1, 1955 |